June 1, 1954
H. K. CYMARA
2,679,720
MACHINE FOR TURNING AND WINDROWING HAY OR THE LIKE
Filed Aug. 27, 1953
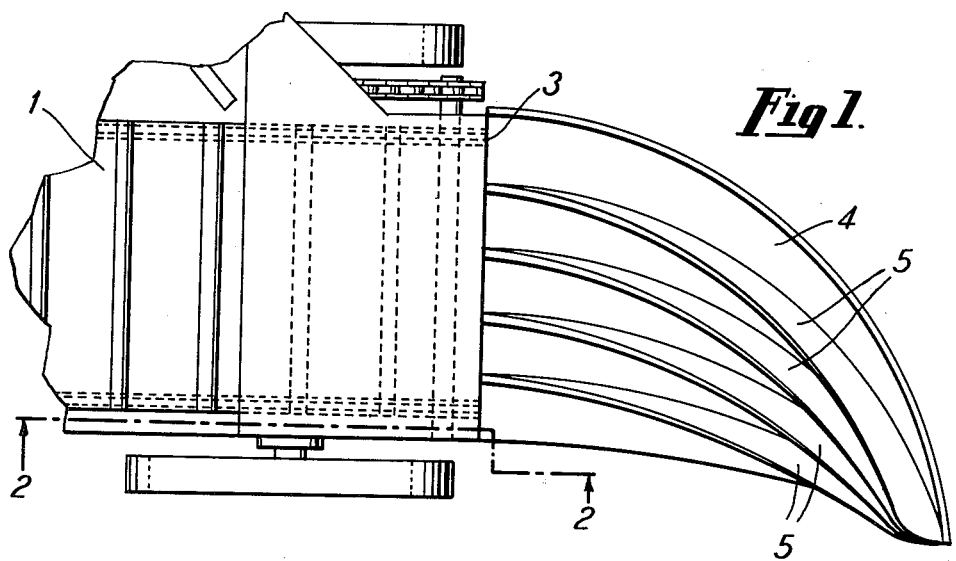
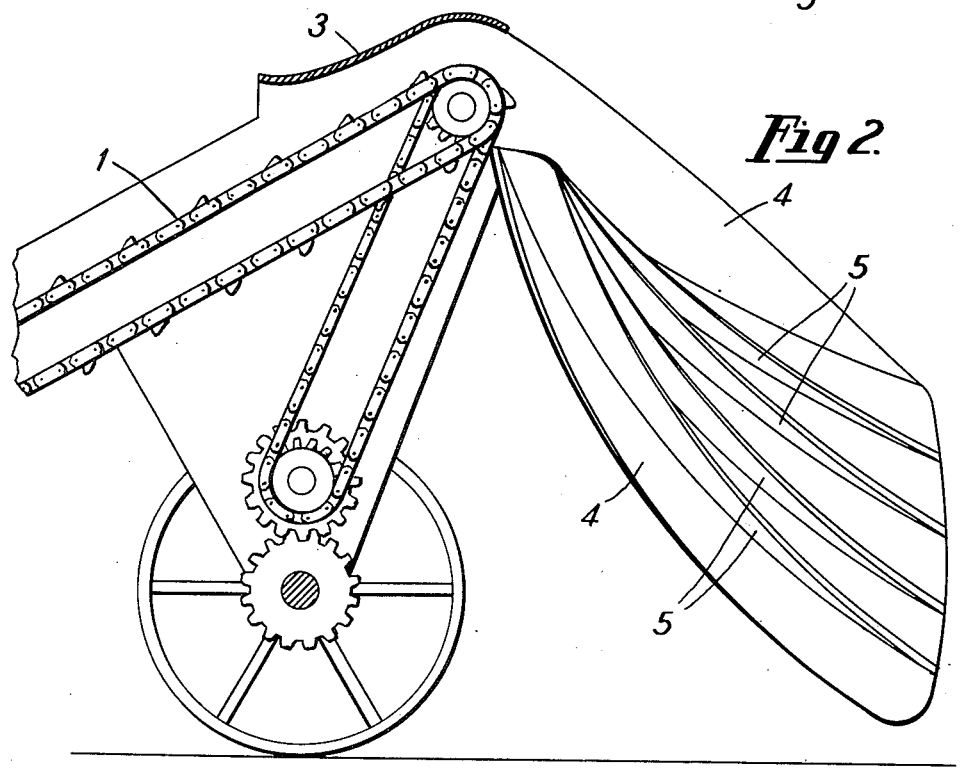
INVENTOR.
HERMANN K. CYMARA
BY Patented June 1, 1954

2,679,720

UNITED STATES PATENT OFFICE 2,679,720

MACHINE FOR TURNING AND WINDROWING HAY OR THE LIKE

Hermann K. Cymara, Ithaca, N. Y.

Application August 27, 1953, Serial No. 376,832

1 Claim. (Cl. 56—370)

The present invention relates to agriculture, and particularly to the process by which hay or leafy crops are harvested and prepared for storage. Such crops when cut lie in the field to dry, and may dry on their upper side while their under side remains damp. Machines have been used to toss the hay about or elevate it and let it fall at random in order to speed up the drying, though the position in which the hay would fall was left more or less to chance.

The modern farmer is aware that grass as a hay crop is uneconomical, and it is being supplanted by the more nutritious leafy crops, such as alfalfa, clover, legumes, birdsfoot trefoil, etc., which have fine leaves containing most of the nutrition. These little leaves dry first before the stems do. In drying, the nutritious leaves become brittle and are easily knocked off by the conventional side-delivery rakes. Falling into the stubble or blowing away, they become a total loss. Yet, particularly when used for dairy feed, the amount of nutrition in the fodder directly affects the cost of producing the milk, so that the particular manner of turning and drying the crop becomes important to the commercial success of the farm.

In my Patent No. 2,609,651, issued September 9, 1952, I described a special form of chute for a hay rake which gently turned the hay over and carried it close to the ground where it deposited the hay in a windrow. The purpose was to avoid undue agitation that might break off the leaves and to prevent them from falling at random long distances thru the air where much could be lost on a windy day. This chute received the hay from the high point of a conveyor, and by a smooth helical motion turned and delivered it down at the side of the machine in a windrow, the lower end of the chute being close to the stubble to avoid loss from wind. While that invention worked well under average conditions, it was found that under certain conditions of heaviness or wetness of the hay, and at certain speeds, the hay might fall too compactly from the lower side of the chute.

The present invention is an improvement on Patent No. 2,609,651 above mentioned, this improvement giving a somewhat different action in which the hay falls off laterally from a considerable number of edges, instead of one. It is prevented from lumping into a single mass and is more lightly handled and somewhat more efficiently turned over. The effect is more a rippling action as contrasted to a single fall.

Referring now to the drawings forming part of this specification,

Fig. 1 is a plan view of the improved chute together with a fragmentary view of the elevating mechanism.

Fig. 2 is a side elevation taken on line 2—2 of Fig. 1, with the helical chute viewed at right angles from the view in Fig. 1, that is, with a quarter turn of the chute.

Similar reference numerals refer to similar parts thruout the various views.

The crop to be turned and windrowed is picked up by any suitable machine and is elevated by a conveyor 1 to the hood 3 where it is somewhat compressed and guided on to the turning chute 4 with which this invention is more particularly concerned. A typical elevating mechanism and other parts are shown in my Patent No. 2,609,651 above mentioned and need not be further described here.

Upon leaving the back of the hood 3 in a somewhat compacted condition the hay falls upon the upper end of the chute 4 which at that height extends straight across the entire width of the delivery hood 3. The helically curved descending face of the chute 4 is provided with several guiding ridges or walls 5 which rise from the inner face of the chute 4 and in general follow its helical contour though they are not necessarily precisely parallel to each other. They are either integral with or firmly secured to the inner face of the chute and so may assist in holding the same in its somewhat complex shape.

The ridges 5 do not guide the hay to the end of the chute as might be expected in an ordinary case, but have a different function, which is to provide a multiplicity of falling edges; since as the bottom or inner face of the chute 4 twists into a vertical position, the hay tends to fall off the side or lateral edges of the ridges 5. In falling down the hay tends to turn over. The lower portion of the chute 4 is close to the ground, only slightly above the stubble, and as the chute sweeps along the turned hay is laid in a windrow at the side of the path of the machine. Thus the crop is gently turned and protected from any undue free fall where the wind might blow off the leaves and carry them away. The result may be a considerable increase in nutritional value as compared with ordinary unguided movement, particularly in windy weather or with leafy crops such as alfalfa.

Having described my invention I claim:

A chute for the turning and windrowing of material such as hay and leafy crops after they are elevated from a field by a conveyor machine, comprising a top hood delivery portion and a material supporting and guiding portion of the chute which at its top extends horizontally across the delivery end of the hood portion and then twists helically downward and laterally to close to the ground so as to lay a windrow along the side and to the rear of the machine, said chute being provided with several guiding ridges on its inner helical face extending in the direction of movement of the descending material, said ridges twisting toward a horizontal position as they near the lower portion of the chute while the helical face of the chute twists down toward a vertical position, so that the material will fall off the edges of the ridges sideways instead of proceeding to the end of the chute, whereby the material is gradually turned over as it proceeds down the helical chute and falls from the ridges so as to be delivered to the ground in an inverted position.

No references cited.